July 22, 1924.
F. D. FOWLER
1,502,027
METHOD OF MANUFACTURING CUSHION TIRES
Filed Nov. 3, 1923  2 Sheets-Sheet 1
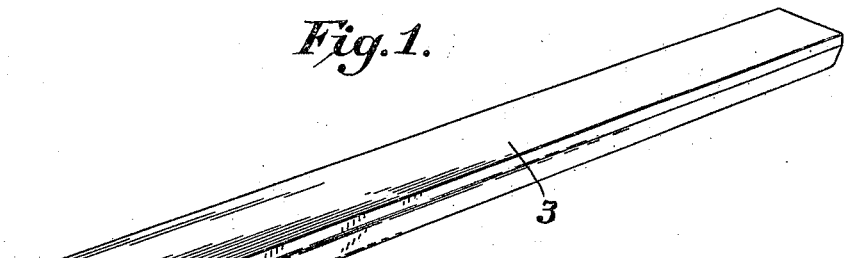
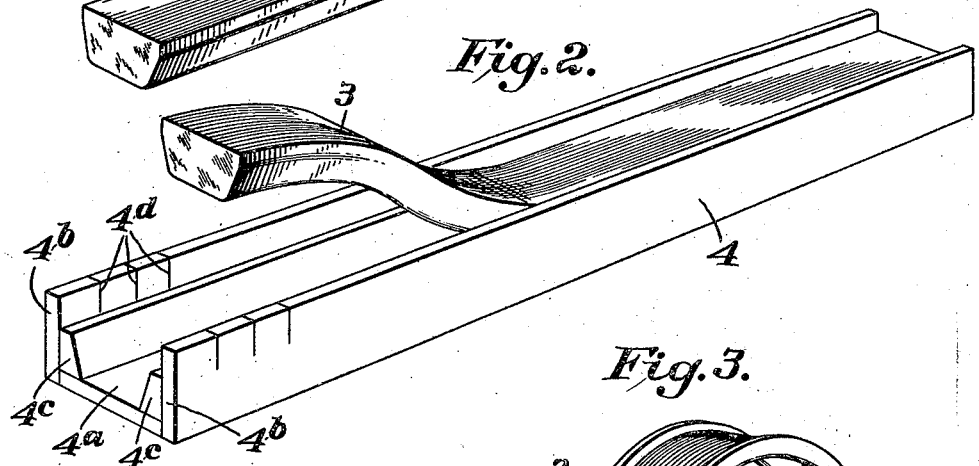
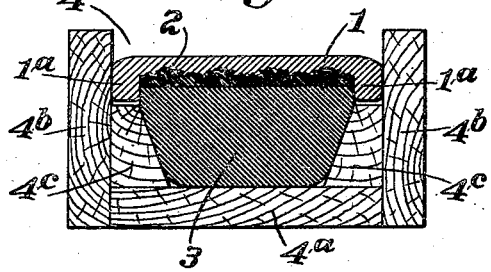
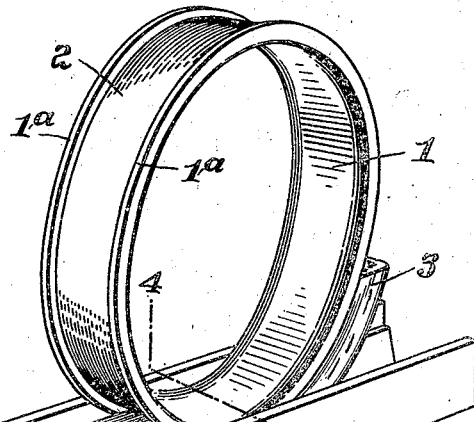
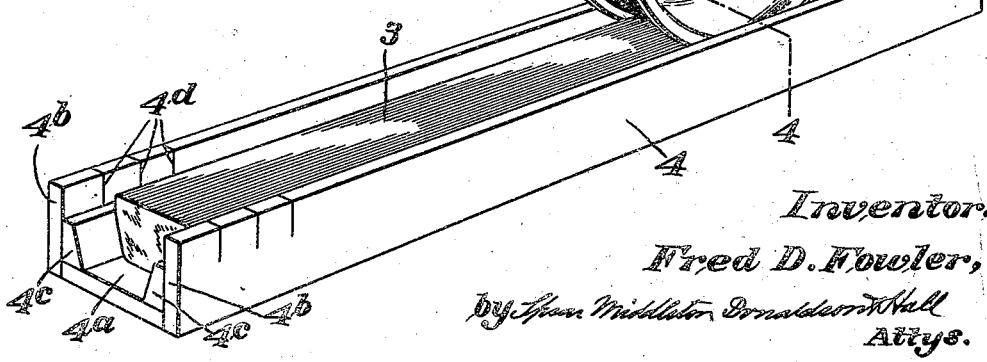
Inventor:
Fred D. Fowler,
Attys.

July 22, 1924.

F. D. FOWLER

METHOD OF MANUFACTURING CUSHION TIRES

Filed Nov. 3, 1923    2 Sheets-Sheet 2

1,502,027

Inventor:
Fred D. Fowler,
by Shur Middleton Donaldson Hall
Attys.

Patented July 22, 1924.

1,502,027

UNITED STATES PATENT OFFICE.

FRED D. FOWLER, OF WATERTOWN, MASSACHUSETTS, ASSIGNOR TO HOOD RUBBER COMPANY, OF WATERTOWN, MASSACHUSETTS, A CORPORATION OF MASSACHUSETTS.

METHOD OF MANUFACTURING CUSHION TIRES.

Application filed November 3, 1923. Serial No. 672,607.

*To all whom it may concern:*

Be it known that I, FRED D. FOWLER, a citizen of the United States, and resident of Watertown, in the county of Middlesex and State of Massachusetts, have invented certain new and useful Improvements in Methods of Manufacturing Cushion Tires, of which the following is a specification.

My said invention relates to an improved method of manufacturing what is known as "hard base" tires, which are tires of cushion rubber vulcanized to a metal base through the intermediary of a layer of hard rubber which serves as a tie between the soft rubber of the tire and the metal carrying rim.

The rubber tread portion has customarily been formed by the use of an extruding machine having a die opening corresponding to the cross section of tire, from which opening the said cushion tread issues as a continuous strip which is cut up into the desired lengths. Heretofore considerable difficulty has been experienced in applying these strips to the rims owing to the tacky nature of the material and its stretchability, coupled with the bulky nature thereof.

The present invention aims to provide a method by which the strips may be accurately severed into the requisite lengths, and rapidly and accurately applied to the carrying rims, and the invention includes the novel method of procedure hereinafter described, and particularly defined by the appended claims.

In order that the invention may be better understood, reference is made to the accompanying drawings, in which:—

Figure 1 is a perspective view of a soft rubber tire strip as formed in an extruding machine in the customary manner.

Fig. 2 is a perspective view showing the method of placing the said strip in a support for application to the rim.

Fig. 3 is a similar view showing the step of applying the strip to the rim.

Fig. 4 is a section on line 4—4 of Fig. 3, and

Figure 5:
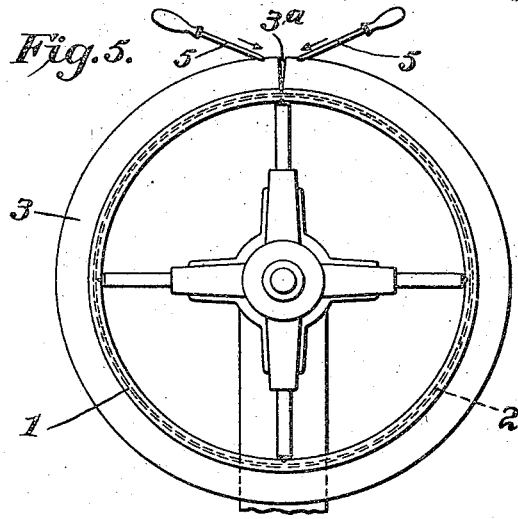
Fig. 5 is a view showing the method of joining the ends.
Figure 6:
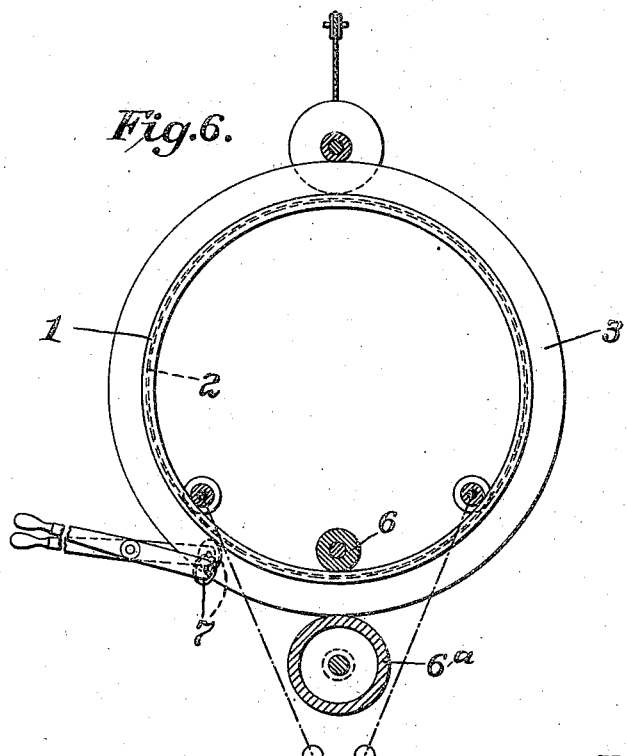
Fig. 6 is a view showing the rolling and stitching action.

Referring by reference characters to this drawing, the numeral 1 designates the usual rim band having the hard rubber base 2 secured thereto in the customary manner. 3 designates the soft rubber cushion tire strip which has been formed in the usual or any desired manner, as for example, by the use of a tubing machine as aforesaid. The material as it issues from the tubing machine is severed into lengths corresponding approximately to the desired tire to be formed, or more properly, to correspond to the circumference of the rim to which the strip is to be applied. Due to variations in operating conditions, such for example, as temperature, speed of the extruding machine, etc., tread strips cut of exactly uniform length may not always be of exactly the same weight. It is desirable that the tires shall be of exactly uniform weight, and to provide for this, I weigh the strips and cut them to uniform weight. The strip 3 is then placed in a supporting and guiding trough 4 which has an interior cross section corresponding to the cross section of the finished tire and rim, said trough embodying a bottom 4ª and sides 4ᵇ, the distance between the inner walls of which at the upper part thereof, corresponds closely to the distance between the exterior faces of the side flanges 1ª of the metal rim 1. The lower corners of the channel thus formed are provided with filling pieces 4ᶜ which cause the lower portion of the channel to conform approximately in shape to the cross section of the cushion tire strip. The strip is placed in the trough by first depositing one end of the strip in one end of the trough and then successively depositing the remaining portions, as indicated in Fig. 2, and as the operator lowers the free end of the strip into the trough, he can determine by indicating marks 4ᵈ on the trough, whether the linear measurement of the strip, as thus deposited, corresponds exactly with the circumference of the tire base to which the strip is to be applied. If he finds that the strip is a little short, he stretches the same sufficiently to cause its end to align accurately with the proper indicating mark, whereas if the strip proves a trifle long, longitudinal pressure in a reverse direction on the strip, compresses the material sufficiently to shorten the strip the desired amount. Thereafter the carrying rim 1 is pressed down upon the strip at one end of the trough causing the end of the strip to adhere to the rim by reason of its sticky and tacky nature. The rim is then rolled over the strip in the manner shown in Fig. 3, causing the strip to be picked up out of the trough by the rim and wound thereon so that the tread is applied to the tire and appears as shown in Fig. 5. Thereafter the rim is supported in any suitable manner, as for example, by an ordinary chuck or spider, shown conveniently in Fig. 5, and operators using blunt edged tools 5, and by pressure in the direction indicated by the arrow, close up the gap 3ª by crowding the material together.

In order to make sure that every part of the tread strip is pressed into contact with the hard rubber base, and the inner corners are pressed or worked into the angles formed by the rim flanges 1ª and hard rubber base, I subject the assembled tire and rim, while suitably guided, to the action of squeezing or pressing rollers 6, 6ª, and the side edges to the action of stitchers shown at 7, 7, which are simply smooth edged rotatings discs. For this purpose I preferably use apparatus such as disclosed in a companion application filed in the U. S. Patent Office on the 21st day of November, 1923, Serial No. 676,148.

Having thus described my invention, what I claim is:—

1. The method of making cushion tires, which consists in placing a cushion tire strip in a channeled guide, rolling over the same a carrying rim to cause the cushion strip to adhere to the rim, and subsequently vulcanizing the tire on the rim.

2. The method of making cushion tires, which consists in depositing a strip of rubber of given weight in a guide trough and subjecting said strip to force exerted in an endwise direction to cause its ends to properly align with a suitable designated indication on the trough, thereafter rolling the rim over the cushion portion to cause the said portion to adhere to the rim, and subsequently vulcanizing.

3. The method of making cushion tires, which consists in providing a strip of cushion material of the proper cross section, placing the same in a guide trough having portions for aligning the cushion strip and other portions constituting rim guiding portions, rolling a rim over the said strip between the said rim guiding portions to cause said cushion strip to adhere to the rim, and subsequently vulcanizing said tire on the rim.

4. The method of making cushion tires, which consists in providing a strip of cushion material of the proper cross section, placing the same in a guide trough having portions for aligning the cushion strip and other portions constituting rim guiding portions, rolling a rim over the said strip between the said rim guiding portions to cause said cushion strip to adhere to the rim, subjecting the end portions of the tire to pressure applied against individual portions thereof to close up the gap between the tire ends, and subsequently vulcanizing the tire to the rim.

5. The method of making hard base tires comprising forming a base of hard rubber on a rim, extruding the cushion portion of the tire, placing said cushion portion on a flat support, rolling the rim over said cushion portion to cause said cushion portion to adhere to the hard rubber base, and subsequently vulcanizing.

6. The method of making cushion tires which consists in placing a cushion strip on a suitable support, rolling over the strip a carrying rim to cause the strip to adhere to the rim, displacing end portions of the strip to fill up the gap between the juxtaposed ends of the cushion strip, thereafter subjecting the cushion strip to progressive pressure applied radially of the rim, and finally vulcanizing the tire.

7. The method of making cushion tires which consists in placing a cushion strip on a suitable support, rolling over the strip a carrying rim to cause the strip to adhere to the rim, displacing end portions of the strip to fill up the gap between the juxtaposed ends of the cushion strip, thereafter subjecting the cushion strip to progressive pressure applied radially of the rim, subjecting the edges of the cushion strip to a "stitching" action, and finally vulcanizing the tire.

In testimony whereof, I affix my signature.

FRED D. FOWLER.